(12) United States Patent
Baldeschi et al.

(10) Patent No.: US 10,387,427 B2
(45) Date of Patent: Aug. 20, 2019

(54) ELECTRONIC DATASET SEARCHING

(71) Applicant: Amadeus S.A.S., Biot (FR)

(72) Inventors: Laurent Baldeschi, Nice (FR); Antoine Vaudaine, Juan les Pins (FR); Cécile Jouve, Golfe Juan (FR); Arnaud Thiery, Antibes (FR); Julien Debon, Lille (FR)

(73) Assignee: AMADEUS S.A.S., Biot (FR)

( * ) Notice: Subject to any disclaimer, the term of this patent is extended or adjusted under 35 U.S.C. 154(b) by 422 days.

(21) Appl. No.: 15/222,381

(22) Filed: Jul. 28, 2016

(65) Prior Publication Data

US 2018/0032581 A1 Feb. 1, 2018

(51) Int. Cl.
*G06F 17/30* (2006.01)
*G06F 16/2457* (2019.01)
*G06F 16/242* (2019.01)

(52) U.S. Cl.
CPC ...... *G06F 16/2457* (2019.01); *G06F 16/2425* (2019.01)

(58) Field of Classification Search
CPC ......... G06F 17/30522; G06F 17/30395; G06F 16/2457; G06F 16/2425
See application file for complete search history.

(56) References Cited

U.S. PATENT DOCUMENTS

| 6,192,336 | B1 | 2/2001 | Manduchi et al. |
| 8,005,685 | B1 | 8/2011 | Bird |
| 8,756,109 | B1 | 6/2014 | Frank et al. |
| 9,235,642 | B1* | 1/2016 | Daniel ............... G06F 17/30864 |
| 2002/0156779 | A1* | 10/2002 | Elliott ................. G06F 17/3087 |
| 2006/0112092 | A1* | 5/2006 | Ziou ........................ G06F 16/54 |
| 2008/0270254 | A1 | 10/2008 | Patoureaux et al. |
| 2014/0172483 | A1 | 6/2014 | Bellers et al. |
| 2016/0162583 | A1* | 6/2016 | Maddocks ........ G06F 17/30867 707/722 |
| 2016/0217169 | A1* | 7/2016 | Elias .................... G06F 21/6227 |

OTHER PUBLICATIONS

Beecks et al, "Signature Quadratic Form Distance", pp. 438-445 (Year: 2010).*
Infosthetics, "flokoon visual search", Jul. 9, 2008 [retrieved from the internet http://infosthetics.com/archives/2008/07/flokoon_visual_search.html].

(Continued)

*Primary Examiner* — Jared M Bibbee
(74) *Attorney, Agent, or Firm* — Thompson Hine LLP

(57) ABSTRACT

Systems, methods, and computer program products for searching electronic datasets. A search query for the electronic dataset is received from a client device. In response to the search query being received, results to the search query are determined, each of the results including data from the electronic dataset. Thereafter, one of the results is selected for display by the client device, and is then transmitted to the client device for display. After the selected result is transmitted to the client device, a rejection of the selected result by a user is received that includes a rationale for the rejection. In response to the rejection of the selected result being received, another one of the results is selected for display by the client device based on the rationale for the rejection. The another result is then transmitted to the client device for display.

20 Claims, 6 Drawing Sheets

(56) References Cited

OTHER PUBLICATIONS

Bloomberg, "Internet Software and Services Company Overview of Flokoon", Dec. 9, 2016 [retrieved from the internet http://www.bloomberg.com/research/stocks/private/snapshot.asp?privcapId=50957508].

Tripzard Website, http://www.tripzard.com (last visited Oct. 24, 2016), 3 pages.

Gnoosic Website, http://www.gnoosic.com/ (last visited Oct. 24, 2016), 3 pages.

Expedia/Tinder Match Made in Travel Website, http://matchmadeintravel.com/ (last visited Oct. 24, 2016), 3 pages.

Tinder (app)—Wikipedia, https://en.wikipedia.org/wiki/Tinder_(app) (last visited Oct. 24, 2016), 7 pages.

Lionel Hoellinger, VisitEurope App Inspires Travel From Start to Finish, http://www.amadeus.com/blog/04/03/visiteurope-app/ (last visited Oct. 24, 2016), 5 pages.

Amadeus Master Pricer Overview, http://www.amadeus.com/web/amadeus/en_1A-corporate/Travel-agencies/Our-portfolio/Serve/Shopping-&-search/Amadeus-Master-Pricer/1319476470250-Solution_C-AMAD_ProductDetailPpal-1319560218703?IndustrySegment=1259068355825&level2=1319608963678&level3=1319609097400 (last accessed Oct. 24, 2016), 2 pages.

Amadeus Master Pricer Main Features, http://www.amadeus.com/web/amadeus/en_1A-corporate/Travel-agencies/Our-portfolio/Serve/Shopping-&-search/Amadeus-Master-Pricer/1319476470250-Solution_C-AMAD_ProductDetailPpal-1319560218703?IndustrySegment=1259068355825&level2=1319608963678&level3=1319609097400 (last accessed Oct. 24, 2016), 2 pages.

* cited by examiner

ELECTRONIC DATASET SEARCHING

TECHNICAL FIELD

The present invention generally relates to electronic datasets, and more particularly, the systems, methods, and computer program products for searching and providing results from electronic datasets.

BACKGROUND

Upon receiving a search request from a user, a conventional search engine typically examines an electronic dataset to determine items from the dataset that match the search request. The search engine then displays the determined items to a user in the form of a list on the user's electronic device. However, because the searched dataset is often quite large, and to that end often includes several items that match the user's search request, the list of items displayed on the user's device tends to be quite large as well. Consequently, the amount of data transmitted to and stored by the user's device to display the list is large, notwithstanding that several items in the list may not be of any interest to the user. Furthermore, some of the items that are of interest to the user may be located later in the list after several items in which the user is not interested, in which case the user often becomes overwhelmed and stops traversing the list prior to reaching the interesting items. Moreover, depending on the available screen space on the user's device, the displayed list can overcrowd the screen space, or can be rendered in a very small font size to fit within the screen space, which in either case makes traversing the list quite difficult. These problems are especially prevalent in mobile devices, which typically include smaller screen sizes.

Accordingly, improved systems, methods, and computer program products are needed for searching electronic datasets and providing increasingly relevant search results to a user in an easily readable format.

SUMMARY

In one embodiment, a method for searching an electronic dataset includes receiving, at one or more processors and from a client device, a search query for the electronic dataset. In response to receiving the search query, the method includes determining, by the one or more processors, results to the search query. Each of the results includes data from the electronic dataset. Thereafter, the method includes selecting, by the one or more processors, a first one of the results for display by the client device, and transmitting, by the one or more processors, the first result to the client device for display by the client device. After the first result is transmitted to the client device, the method includes receiving, at the one or more processors and from the client device, a rejection of the first result by a user. The rejection includes a rationale for the rejection of the first result. In response to receiving the rejection of the first result, the method includes selecting, by the one or more processors, a second one of the results for display by the client device based on the rationale for the rejection, and transmitting, by the one or more processors, the second result to the client device for display by the client device.

In response to receiving the search query, the method may also include determining an initial data reference point based on the search query. Consequently, selecting the first result for display by the client device may include determining which of the results is closest to the initial data reference point, and selecting the result that is closest to the initial data reference point as the first result. Furthermore, selecting the second result for display by the client device based on the rationale for the rejection may include, in response to receiving the rejection, adjusting the initial data reference point based on the rationale, determining which of the results that have not yet been transmitted to the client device for display is closest to the adjusted data reference point, and selecting the result that has not yet been transmitted to the client device for display that is closest to the adjusted data reference point as the second result.

After the second result is transmitted to the client device, the method may also include receiving, from the client device, an indication that the user is interested in the second result. In response to receiving the indication that the user is interested in the second result, the method may further include adding the second result to a cache of results in which the user is interested, determining which of the results that have not yet been transmitted to the client device for display is closest to the adjusted data reference point, and transmitting the result that has not yet been transmitted to the client device for display that is closest to the adjusted data reference point to the client device for display.

The initial data reference point may include first values that are each associated with a different one of two or more categories, and each of the results may include attributes that are each related to a different one of the categories. Consequently, determining the results to the search query may include assigning second values to each of the results, where each of the second values may be associated with a different one of the categories and may be based on the attribute of the result that relates to the associated category. Furthermore, determining which of the results is closest to the initial data reference point may include, for each of the results, computing a first weighted quadratic distance between the initial data reference point and the result based on the first values of the initial data reference point and the second values assigned to the result, and selecting the result with the lowest first weighted quadratic distance as the result that is closest to the initial data reference point.

The method may also include assigning a third value to each of the categories. The third value assigned to each category may indicate an importance of the category to the user. Consequently, computing the first weighted quadratic distance between the initial data reference point and each of the results may further be based on the third value assigned to each of the categories.

The rationale for the rejection may relate to one of the categories. Consequently, selecting the second result for display by the client device based on the rationale for the rejection may include increasing the third value assigned to the category to which the rationale for the rejection relates, and selecting the second result for display by the client device based on the increased third value. Moreover, the rationale for the rejection may indicate that one of the second values assigned to the first result is too low. Consequently, selecting the second result for display by the client device based on the rationale for the rejection may include adjusting the initial data reference point by increasing the first value that is associated with the category associated with the second value indicated by the rationale as being too low, computing a second weighted quadratic distance between the adjusted data reference point and each of the results that have not yet been transmitted to the client device for display, and selecting the result with the lowest second weighted quadratic distance as the second result.

In response to receiving the first result, the client device may be configured to display a graphical user interface for the first result on a screen of the client device. The graphical user interface may include a plurality of icons, and each of the icons may be associated with a different one of the categories. The graphical user interface may also be configured to enable the user to move one the icons to one of two or more portions of the screen of the client device, and the rationale for rejecting the first result may be determined based on which of the portions of the screen the icon is moved.

The search query may include search criteria, and the electronic dataset may include primary object databases, a cache database, and supplemental information databases provided by third parties. Consequently, determining the results to the search query may include retrieving, from the primary object databases, primary data objects based on the search criteria. After the primary data objects are retrieved, the method may include retrieving, from the cache database, supplemental data for each primary data object of a first subset of the primary data objects. The cache database may include supplemental data retrieved in connection with one or more previous search queries. After the supplemental data for each primary data object in the first subset of primary data objects is retrieved from the cache database, the method may include retrieving, from the supplemental information databases provided by the third parties, supplemental data for each of the primary data objects for which supplemental data was not retrieved from the cache database. The method may further include formulating the results based on the primary data objects and the supplemental data retrieved from each of the primary data objects. Each of the results may include at least a portion of one of the primary data objects and the supplemental data retrieved for the primary data object.

In another embodiment, a system for searching an electronic dataset includes at least one processor and a memory storing instructions. The instructions, upon execution by the at least one processor, cause the system to, in response to receiving, from a client device, a search query for the electronic dataset, determine results to the search query. Each of the results includes data from the electronic dataset. Thereafter, the instructions cause the system to select a first one of the results for display by the client device, and transmit the first result to the client device for display by the client device. After the first result is transmitted to the client device, and in response to receiving, from the client device, a rejection of the first result by a user, the rejection including a rationale for the rejection of the first result, the instructions cause the system to select a second one of the results for display by the client device based on the rationale for the rejection, and transmit the second result to the client device for display by the client device.

The instructions upon execution may further cause the system to, in response to receiving the search query, determine an initial data reference point based on the search query. Consequently, the instructions may cause the system to select the first result for display by the client device by causing the system to determine which of the results is closest to the initial data reference point, and select the result that is closest to the initial data reference point as the first result. Furthermore, the instructions may cause the system to select the second result for display by the client device based on the rationale for the rejection by causing the system to, in response to receiving the rejection, adjust the initial data reference point based on the rationale, determine which of the results that have not yet been transmitted to the client device for display is closest to the adjusted data reference point, and select the result that has not yet been transmitted to the client device for display that is closest to the adjusted data reference point as the second result.

After the second result is transmitted to the client device, and in response to receiving, from the client device, an indication that the user is interested in the second result, the instructions upon execution may further cause the system to add the second result to a cache of results in which the user is interested, determine which of the results that have not yet been transmitted to the client device for display is closest to the adjusted data reference point, and transmit the result that has not yet been transmitted to the client device for display that is closest to the adjusted data reference point to the client device for display.

The initial data reference point may include first values that are each associated with a different one of two or more categories, and each of the results may include attributes that are each related to a different one of the categories. Consequently, the instructions may cause the system to determine the results to the search query by causing the system to assign second values to each of the results. Each of the second values may be associated with a different one of the categories, and may be based on the attribute of the result that relates to the associated category. Furthermore, the instructions may cause the system to determine which of the results is closest to the initial data reference point by causing the system to, for each of the results, compute a first weighted quadratic distance between the initial data reference point and the result based on the first values of the initial data reference point and the second values assigned to the result, and select the result with the lowest first weighted quadratic distance as the result that is closest to the initial data reference point.

The instructions upon execution may further cause the system to assign a third value to each of the categories. The third value assigned to each category may indicate an importance of the category to the user. Consequently, the instructions may cause the system to compute the first weighted quadratic distance between the initial data reference point and each of the results based on the third value assigned to each of the categories.

The rationale for the rejection may relate to one of the categories. Consequently, the instructions may cause the system to select the second result for display by the client device based on the rationale for the rejection by causing the system to increase the third value assigned to the category to which the rationale for the rejection relates, and select the second result for display by the client device based on the increased third value. Furthermore, the rationale for the rejection may indicate that one of the second values assigned to the first result is too low. Consequently, the instructions may cause the system to select the second result for display by the client device based on the rationale for the rejection by causing the system to adjust the initial data reference point by increasing the first value that is associated with the category associated with the second value indicated by the rationale as being too low, compute a second weighted quadratic distance between the adjusted data reference point and each of the results that have not yet been transmitted to the client device for display, and select the result with the lowest second weighted quadratic distance as the second result.

In a further embodiment, a computer program product includes a non-transitory computer readable storage medium and instructions stored on the non-transitory computer readable storage medium. The instructions, upon execution by one or more processors of a system, cause the system to, in response to receiving, from a client device, a search query for an electronic dataset, determine results to the search query. Each of the results includes data from the electronic dataset. Thereafter, the instructions cause the system to select a first one of the results for display by the client device, and transmit the first result to the client device for display by the client device. After the first result is transmitted to the client device, and in response to receiving, from the client device, a rejection of the first result by a user, the rejection including a rationale for the rejection of the first result, the instructions cause the system to select a second one of the results for display by the client device based on the rationale for the rejection, and transmit the second result to the client device for display by the client device.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

Embodiments of the present invention will be understood and appreciated more fully from the following detailed description taken in conjunction with the drawings.

DETAILED DESCRIPTION

Described herein are inventive systems, methods, and computer program products for searching electronic datasets to determine results for a search query, and providing such results to a user. However, rather than the conventional practice of displaying a large list of results to the user, which may overwhelm the user and thereby cause some relevant results to be overlooked, embodiments described herein display one result to the user at time. For each displayed result, the user may indicate whether he or she is interested with the result. If the user indicates that he or she is not interested with a given result, then the user may also provide a rationale that the result is unsatisfactory. The next result displayed to the user may then be adjusted based on the user's provided rationale. In this way, each displayed result may be dynamically determined based on a user-input received for one or more previously displayed results, which enables the embodiments to provide an increasingly focused user experience and increased relevancy when searching a large electronic dataset, while also realizing computer resource savings. These embodiments may be especially beneficial in situations involving devices with smaller displays, such as mobile phones and tablets, which by their nature are often not well-suited for traversing large lists of results.

Figure 1:
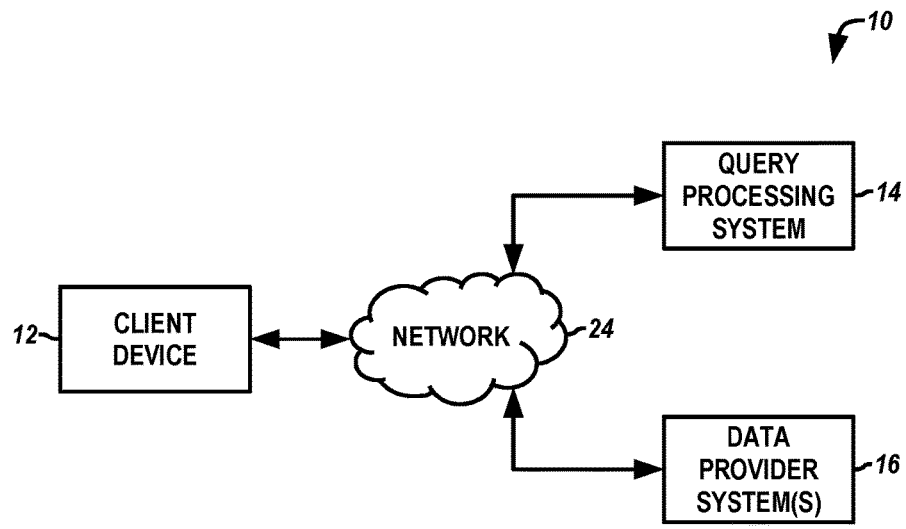
FIG. 1 is a schematic view of an exemplary operating environment that includes a plurality of systems for searching an electronic dataset.

Turning now to the Figures, FIG. 1 illustrates an operating environment 10 that may include a client device 12, a query processing system 14, and one or more data provider systems 16. Each of these systems may be communicatively enabled to interact with one another via a network 24, such as the Internet. Moreover, two or more of the systems may be combined with one another. For example, the query processing system 14 may be hosted on one or more of the data provider systems 16.

The client device 12 may be an electronic device that enables a user to access remote information and services via the Internet. In particular, the client device 12 may include a browser and/or one or more apps that allow a user to access the query processing system 14 and the data provider systems 16. Non-limiting examples of a client device 12 include a desktop computer, a laptop computer, or a mobile electronic device such as a mobile phone or tablet, which may include a smaller display that limits a user's ability to easily traverse a large list of results for a search query.

The query processing system 14 may be configured to enable a user, such as via the client device 12, to submit a search query for a large electronic dataset, which may be hosted on one or more of the data provider systems 16. In particular, a user may utilize the client device 12 to access a graphical user interface (GUI), which may be stored on the query processing system 14 and/or the client device 12, and thereby define and submit the search query. The search query may include a plurality of search criteria defined by the user via the GUI. In response to receiving the search query, the query processing system 14 may submit a search request to the data provider systems 16 for data relating to the search criteria of the search query. Thereafter, the query processing system 14 may generate a plurality of results for the search query based on the data received from the data provider systems 16.

Given that the dataset relating to the received search query may be quite large, the number of results generated by the query processing system 14 may likewise be large. For example, when the search query is a request for a plurality of travel recommendations, the query processing system 14 may generate upwards of around eight hundred results. Of course, the user is unlikely to be interested in all eight hundred results generated by the query processing system 14, and the user will probably not want to traverse all eight hundred results via the client device 12. This especially holds true when the display of the client device 12 is of a limited screen size such that displaying all eight hundred results would effect a cumbersome graphical user interface and/or such that traversing all eight hundred results would be a difficult and overwhelming task, which as described above may lead to several interesting results being overlooked.

To this end, one conventional approach for displaying a large list of results to a user via a client device is sorting the results according to a predetermined criterion, such as price, and then displaying the sorted results. However, this approach still produces an unwieldy number of results for the user to traverse, and some interesting results having a higher price may continue to be overlooked by the user. Furthermore, the conventional approach lacks any mechanism by which the results are dynamically re-sorted based on the user's input relative to one of the results (e.g., an input indicating that a result is not interesting to the user for a given reason), which means that that the user may have to traverse through a long series of non-relevant and uninteresting results before coming to a result in which the user is interested.

In order to optimize usage of the display of the client device 12, and improve search relevancy and efficiency, the query processing system 14 may be configured to transmit one determined result at a time to the client device 12 for display. More particularly, the query processing system 14 may transmit a particular result to the client device 12, which may then display the result to the user and enable the user to provide an input regarding whether the displayed result is interesting to the user. Only after the user provides such an input may the query processing system 14 transmit another result to the client device 12 for display. In this way, the user is not overwhelmed by having to traverse through an unwieldy list of results, and the screen of the client device 12 is similarly not overcrowded by displaying a large number of results at the same time. Furthermore, because only one result is transmitted to and displayed by the client device 12 at a time, the client device 12 is able to realize resource savings. In particular, rather than receiving, storing, and processing data indicative of an entire list of results for a search query, the client device 12 only needs to store and process data for each displayed result. Thus, even if several results are ultimately transmitted to and displayed on the client device 12, the amount of overall data stored and processed by the client device 12 is still less than the amount of data that would be processed and stored if the entire set of results determined by the query processing system 14 were transmitted to and displayed by the client device 12.

Moreover, the query processing system 14 may utilize a user-input received for a displayed result, which as described above may indicate whether the user is interested in the displayed result, to determine the next result to transmit to the client device 12 for display. In particular, the user-input may indicate a rationale that the user is not interested in a given result, and the query processing system 14 may dynamically select the next result to transmit to the client device 12 for display based on the indicated rationale. In this this way, the results provided to the client device 12 for display become increasingly relevant to the user as a user continues to provide inputs via the client device 12.

The data provider systems 16 may include the systems of one or more providers of data that is used to respond to a search query submitted via the client device 12. In particular, in response to receiving a search query from the client device 12, the query processing system 14 may communicate with the data provider systems 16 to determine the plurality of results for the search query. For example, in one embodiment, the search query may be a request for a plurality of travel recommendations. In this case, the data provider systems 16 may include a system that provides data relating to travel availability, such as a global distribution system "GDS", and may also include additional systems that collect and provide data supplemental to the travel availability data, such as systems including image search engines, map search engines, and weather search engines.

Figure 2:
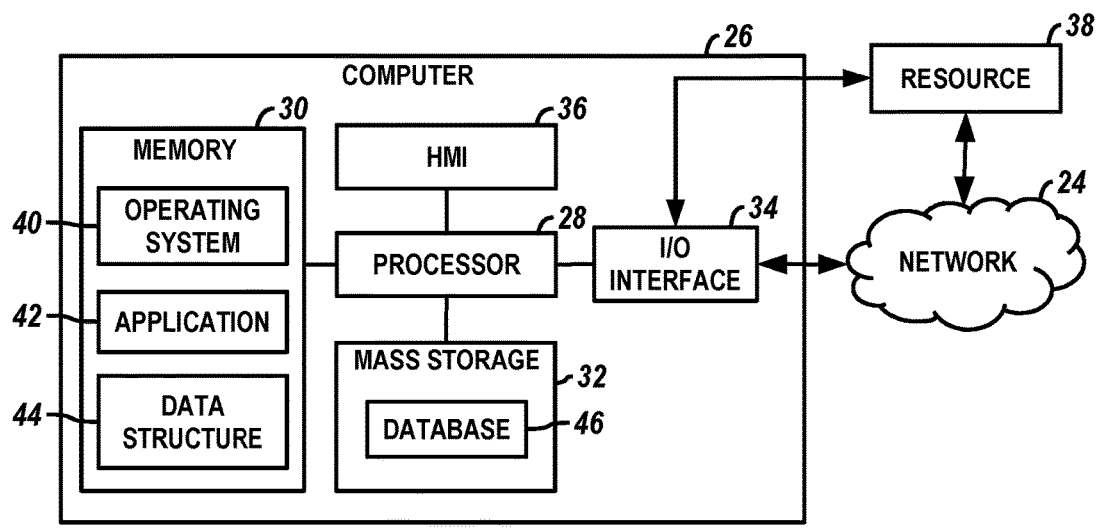
FIG. 2 is a schematic view of an exemplary computer system in FIG. 1.

Referring now to FIG. 2, the client device 12, the query processing system 14, and the data provider systems 16 of operating environment 10 may be implemented on one or more computer devices or systems, such as exemplary computer system 26. The computer system 26 may include a processor 28, a memory 30, a mass storage memory device 32, an input/output (I/O) interface 34, and a Human Machine Interface (HMI) 36. The computer system 26 may also be operatively coupled to one or more external resources 38 via the network 24 or I/O interface 34. External resources may include, but are not limited to, servers, databases, mass storage devices, peripheral devices, cloud-based network services, or any other suitable computer resource that may be used by the computer system 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. The memory 30 may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. The mass storage memory device 32 may include data storage devices such as a hard drive, optical drive, tape drive, non-volatile solid state device, or any other device capable of storing information.

The processor 28 may operate under the control of an operating system 40 that resides in the memory 30. The operating system 40 may manage computer resources so that computer program code embodied as one or more computer software applications, such as an application 42 residing in memory 30, may have instructions executed by the processor 28. In an alternative embodiment, the processor 28 may execute the application 42 directly, in which case the operating system 40 may be omitted. One or more data structures 44 may also reside in memory 30, and may be used by the processor 28, operating system 40, or application 42 to store or manipulate data.

The I/O interface 34 may provide a machine interface that operatively couples the processor 28 to other devices and systems, such as the network 24 or the one or more external resources 38. The application 42 may thereby work cooperatively with the network 24 or the external resources 38 by communicating via the I/O interface 34 to provide the various features, functions, applications, processes, or modules comprising embodiments of the invention. The application 42 may also have program code that is executed by the one or more external resources 38, or otherwise rely on functions or signals provided by other system or network components external to the computer system 26. Indeed, given the nearly endless hardware and software configurations possible, persons having ordinary skill in the art will understand that embodiments of the invention may include applications that are located externally to the computer system 26, distributed among multiple computers or other external resources 38, or provided by computing resources (hardware and software) that are provided as a service over the network 24, such as a cloud computing service.

The HMI 36 may be operatively coupled to the processor 28 of computer system 26 in a known manner to allow a user to interact directly with the computer system 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, push-buttons, control knobs, microphones, etc., capable of accepting commands or input from the user and transmitting the entered input to the processor 28.

A database 46 may reside on the mass storage memory device 32, and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where a query may be dynamically determined and executed by the operating system 40, other applications 42, or one or more modules.

Figure 3:
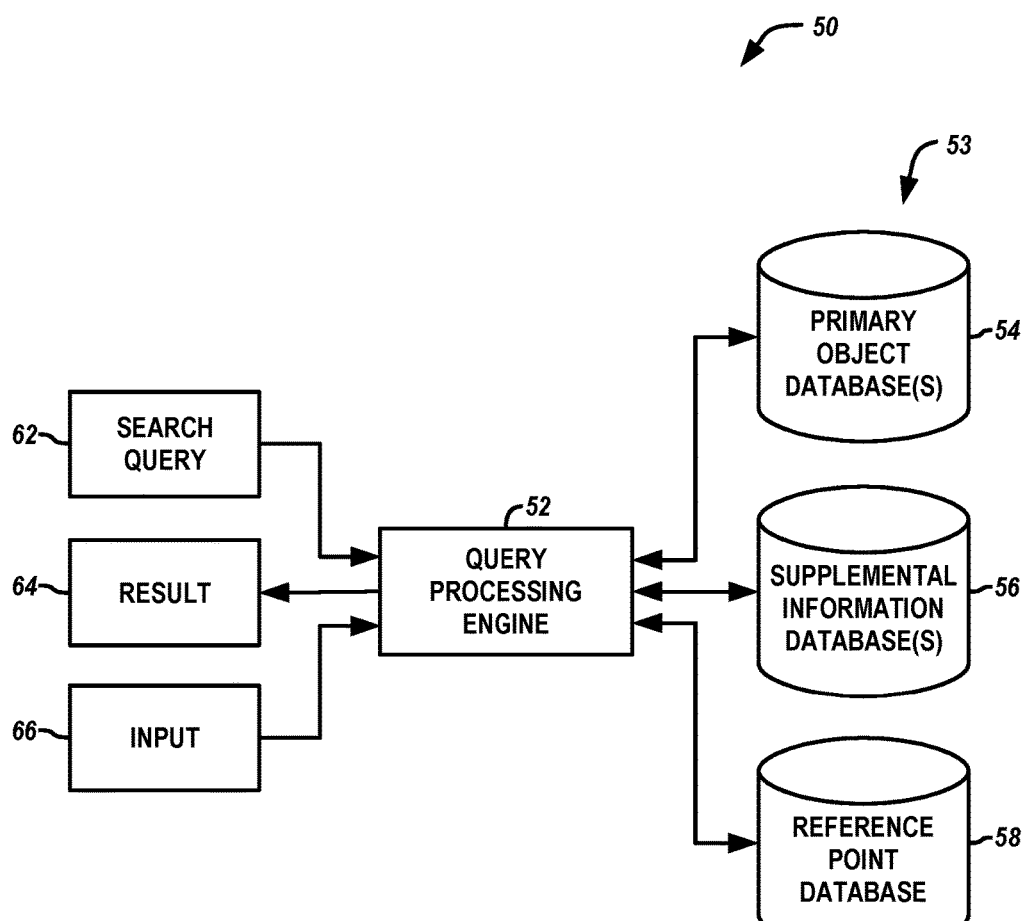
FIG. 3 is a schematic view of an exemplary processing architecture that may be implemented by one or more of the computer systems of FIG. 1.

FIG. 3 illustrates an exemplary processing architecture 50 that may be provided by one or more of the systems of operating environment 10. The processing architecture 50 may include a query processing engine 52 and an electronic dataset 53, which may include one or more primary object databases 54 and one or more supplemental information databases 56. The processing architecture 50 may also include a reference point database 58.

In operation, the query processing engine 52 may receive a search query 62 from for the electronic dataset 53, such as from the client device 12. In response to receiving the search query 62, the query processing engine 52 may trigger interactions with the electronic dataset 53, or more particularly the primary object databases 54 and the supplemental information databases 56, to determine a plurality of results 64 for the search query 62. In particular, each result 64 may include data from the electronic dataset 53, or more particularly from the primary object database 54 and the supplemental information databases 56. Thereafter, based on data stored in the reference point database 58, the query processing engine 52 may select one of the results 64 for display to the user, such as via the client device 12. The query processing engine 52 may then cause the selected result 64 to be displayed to the user, such as by transmitting the selected result 64 to the client device 12 for display by the client device 12.

After the selected result 64 is transmitted to and displayed by the client device 12, the user may provide an input 66 to the query processing engine 52, such as via the client device 12. As previously discussed, the input 66 may indicate whether or not the user is interested in the displayed result 64. In response to receiving the input 66, the query processing engine 52 may proceed to select another one of the results 64 based on the input 66, and then cause the newly selected result 64 to be displayed to the user, such via transmission to the client device 12. The user may then provide another input 66 regarding the newly displayed result 64. This process of selecting a result 64 for display to the user and receiving an input 66 may be repeated until the user instructs the query processing engine 52, such as via the client device 12, to discontinue selecting further results 64 for display. Additional details relating to the processing architecture 50 are discussed below in reference to FIGS. 4 through 9.

Figure 4:
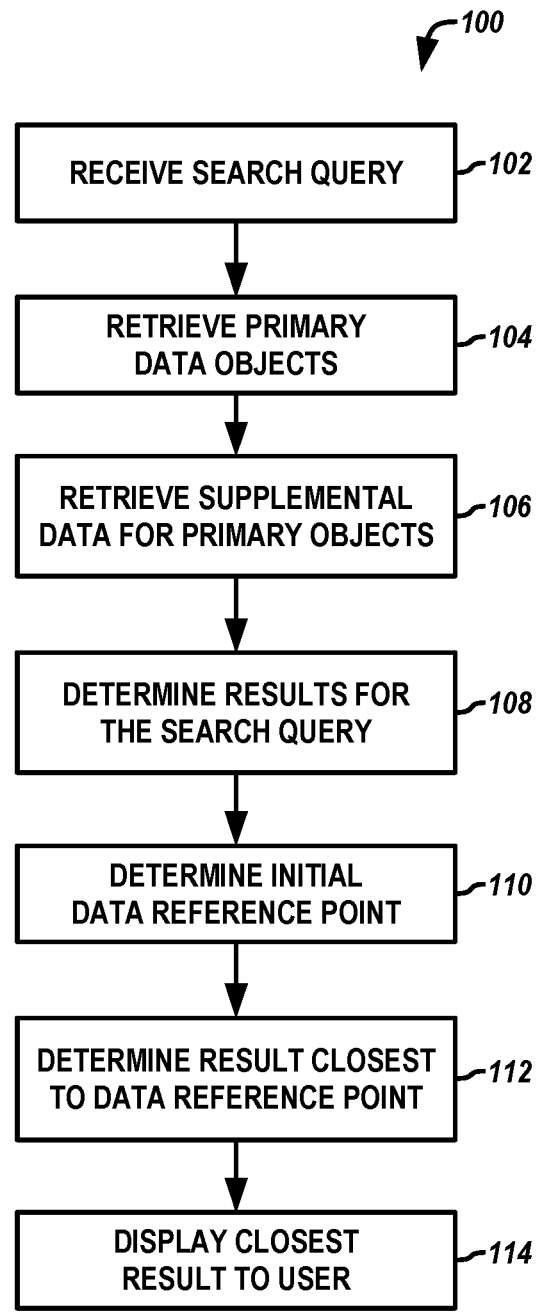
FIG. 4 is a flowchart of an exemplary method for processing a search query for an electronic dataset that may be performed by the processing architecture of FIG. 3.

FIG. 4 illustrates a process 100 for processing a search query 62 received in connection with the electronic dataset 53. The process 100 may be performed by the query processing engine 52 of the processing architecture 50.

In block 102, a search query 62 for the electronic dataset 53 may be received, such as at the query processing engine 52. In particular, a user may access a GUI, which may be generated by the client device 12 and/or the query processing engine 52, to define and submit the search query 62 to the query processing engine 52. The search query 62 may include a plurality of search criteria defined by the user for searching the electronic dataset 53, which may be stored across the primary object databases 54 and the supplemental information databases 56.

As previously mentioned, in one exemplary embodiment, the search query 62 may be a request for a plurality of travel recommendations. More particularly, the search query 62 may be a request for travel inspiration, or in other words, a request for travel destination suggestions for the user. In this case, non-limiting examples of search criteria that may be included in the search query 62 include a date or date range, a duration or duration range, an origin city, a budget or budget range, a temperature or temperature range, and a distance or distance range.

In block 104, in response to receiving the search query 62, a plurality of primary data objects may be retrieved, such as from the primary object databases 54, based on the search criteria of the search query 62. In particular, the query processing engine 52 may be configured to trigger a search of the primary object databases 54 to retrieve a plurality of primary data objects that match one or more of the search criteria of the search query 62. Each of the results 64 determined by the query processing engine 52 may include at least a portion of one of the primary data objects retrieved from the primary object databases 54.

When the search query 62 is a request for a plurality of travel recommendations, the primary object databases 54 may include data representative of a plurality of travel options. For example, the primary object databases 54 may include one or more travel databases that store data indicative of scheduled flight segments and scheduled travel segments relating to other modes of transportation, as well as availability data for each the scheduled segments. In some embodiments, the travel databases may be provided by one or more third party systems, such as a GDS, an online travel agent (OTA), a computer reservation system (CRS), or other travel search web site.

Thus, in response to receiving a search query 62 that is a request for one or more travel recommendations, the query processing engine 52 may trigger a search of the travel databases. This search may be based on the search criteria relevant to the data stored in the travel databases. For example, the relevant search criteria may include the date or date range search criteria, the duration or duration range search criteria, the origin search criterion, and/or the budget or budget range search criteria. In some instances, the query processing engine 52 may submit a search request that includes the relevant search criteria to the third party systems providing the travel databases, which may then proceed to conduct the search of the travel databases and return the resulting travel options to the query processing engine 52. Additionally or alternatively, the query processing engine 52 may be configured to conduct a direct search of one or more of the travel databases using the relevant search criteria. Each travel option returned to the query processing engine 52 from the travel databases or the third party systems providing the travel databases may be considered a primary data object, and each result 64 determined by the query processing engine 52 may include at least a portion of one of the travel options, such as a travel destination and a date or date range included in the travel option.

In block 106, supplemental data may be retrieved for each of the retrieved primary data objects. In particular, the query processing engine 52 may trigger a search of the supplemental information databases 56 to retrieve supplemental data about each primary data object that was retrieved in block 104. When a result 64 including all or part of a given primary data object is displayed to the user, the supplemental data retrieved for that primary data object may also be displayed. Such supplemental data may assist the user in determining whether the displayed result 64 is interesting, and may also be utilized by the query processing engine 52 to dynamically determine which results 64 to display to the user, as described in more detail below. For example, when the retrieved primary data objects represent a plurality of travel options, the supplemental information databases 56 may include supplemental data for travel destinations included the travel options. In particular, the supplemental information databases 56 may include one or more of weather information, images, uniform resource locators (URLs), maps, coordinates, and social network data (e.g., the number of likes) for each of the travel destinations.

In some embodiments, the supplemental information databases 56 may include a plurality of databases, each including data related to a different aspect of the retrieved primary data objects. For example, when the retrieved primary data objects represent a plurality of travel options, one of the supplemental information databases 56 may include an image for one or more destinations in the travel options, another one of the supplemental information databases 56 may include weather information for one or more travel destinations in the travel options, and so forth.

Furthermore, similar to the primary object databases 54, one or more of the supplemental information databases 56 may be provided by third party systems operated by a plurality of third parties. For example, a supplemental information database 56 including images of travel destinations may be provided by an image search engine system of a third party, a supplemental information database 56 including historic weather information for travel destinations may be provided by a system of a third party that collects and distributes weather data, and so forth. In these cases, in order to retrieve supplemental data for the retrieved primary data objects, the query processing engine 52 may submit search requests that include relevant search criteria to the systems providing the supplemental information databases 56, which may then proceed to conduct the search of the supplemental information databases 56, and return the resulting supplemental data to the query processing engine 52. For example, in the case of retrieving weather information for a given travel destination of a travel option, the query processing engine 52 may submit a search request that includes the travel destination and the date or date range search criteria to an online system that provides weather information, which may then return weather information for the given travel destination for the date or date range to the query processing engine 52.

Additionally or alternatively, the query processing engine 52 may be configured to conduct a direct search of one or more of the supplemental information databases 56 using the relevant search criteria. For example, in some embodiments, the supplemental information databases 56 may include a cache database of supplemental data recently or often retrieved in connection with one or more previously submitted search queries 62. In this way, after retrieving the primary data objects, but prior to searching the supplemental information databases 56 provided by third parties, the query processing engine 52 may trigger a search of the cache database to retrieve supplemental data relating to one or more, or a subset, of the retrieved primary data objects. Because the cache database may be relatively local and/or in direct connection to the query processing engine 52, it may enable the query processing engine 52 to receive supplemental data for one or more of the primary data objects faster than submitting search requests to the third party systems. After searching the cache database, the query processing engine 52 may then proceed to submit search requests to the third party systems to retrieve supplemental data from the supplemental information databases 56 provided by the third party systems for those retrieved primary data objects for which no supplemental data was available in or retrieved from the cache database.

In block 108, a plurality of results 64 may be determined for the search query 62, such as by the query processing engine 52, where each of the results 64 may include data retrieved from the electronic dataset. In particular, the query processing engine 52 may formulate the results 64 based on the retrieved primary data objects and the supplemental data retrieved for each of the retrieved primary data objects, such as by combining all or part of each retrieved primary data object with the supplemental data retrieved from that primary data object into a result 64. In other words, each result 64 may include at least a portion of one of the primary data objects, such as the travel destination and/or dates of a travel option, and the supplemental data retrieved for the primary data object.

Each result 64 determined by the query processing engine 52 may also include one or more values assigned thereto that describe the result 64 relative to one or more categories. The one or more categories may overlap with at least some of the search criteria included in the search query 62. For example, when the results 64 include travel recommendations, the one or more categories may include a price category, a distance category, a duration category, and/or a weather category.

More particularly, each of the results 64 may include one or more attributes that are each related to different one of the one or more categories. For example, when the results 64 include travel recommendations, each travel recommendation may include a price, which relates to the price category, an average temperature at a travel destination during a particular date or date range, which relates to the weather category, and a distance of the travel destination from the origin search criteria included in the search query 62, which relates to the distance category. The query processing engine 52 may assign a plurality of values to each of the results 64 based on the attributes of the result 64, where each of the values assigned to a given result 64 is associated with the category related to the attribute on which the value was based. For example, referring again to the case where the results 64 include travel recommendations, if a given result 64 includes supplemental data indicating that a travel destination of the result 64 has an attribute of being very hot during the date or date range submitted by the user, then the query processing engine 52 may assign a relatively high value to the result 64 for the weather category (e.g., assign a value of ten out of ten to the result 64 for the weather category). Alternatively, if the supplemental data indicates that the travel destination has an attribute of being quite cold during the date or date range submitted by the user, then the query processing engine 52 may assign a relatively low value to the result 64 for the weather category (e.g., assign a value of one out of ten to the result 64 for the weather category). Similar assignments may also be made to the result 64 for the other categories based on the other attributes of the result 64.

In some embodiments, for each of one or more of the categories, each value in the range of possible values that may be assigned to a given result 64 for the category may be associated with a potential attribute or a range of potential attributes of the result 64 in relation to the category. For example, with respect to the price category, the range of possible values that may be assigned to a given result 64 may be one through ten, where one is associated with travel options less than one hundred dollars, two is associated with travel options between one hundred and two hundred dollars, and so on. Additionally or alternatively, the value assigned to a result 64 for a given category may be equal to the attribute of the result 64 relative to the given category. For example, if a result 64 indicates that the average temperature during a submitted date or date range at a travel destination is equal to a numerical value of eighty-four degrees Fahrenheit, then the query processing engine 52 may assign a value of eighty four to the result 64 for the weather category.

Each of the categories may also be assigned a weight value, such as by the query processing engine 52. In general, a weight value assigned to a category may indicate an importance the category to the user (e.g., the higher the weight value, the more important the associated category). For example, each weight value may be a percentage or a number. In some embodiments, the user may define the weight values for one of more of the categories when creating the search query 62 such that that defined weight values may be included in the search query 62 when it is submitted to the query processing engine 52, which may then assign the weight values to the one or more categories accordingly. Additionally or alternatively, in response to receiving the search query 62, the query processing engine 52 may automatically assign weight values to one or more of the categories, such as based on information included a user profile associated with the submitting user. For example, the user profile may indicate that distance is an unimportant factor to the user and so the distance category should be associated with a low weight value, and that price is a rather important factor to the user and so the price category should be associated with a high weight value. Alternatively, the user profile may explicitly set forth different weight values for the query processing engine 52 to assign to one or more of the categories.

In block 110, an initial data reference point may be determined, such as by the query processing engine 52. The initial data reference point may be based on the search query 62, and more particularly, may represent the theoretical "perfect" result to the search query 62. Like the results 64, the initial data reference point may include one or more values assigned thereto relative to the one or more categories. Specifically, each of the one or more values assigned to the initial data reference point may be associated with a different one of the one or more categories. The query processing engine 52 may be configured to determine the initial data reference point based on one or more of the search criteria in the search query 62, and based on data stored in the reference point database 58.

Specifically, the reference point database 58 may include historical data relating to previous search queries 62 received and processed by the query processing engine 52. The historical data may indicate, for each of the previous search queries 62, the results 64 that a user indicated as interesting and/or resulted in a purchase. Thus, to determine the initial data reference point, the query processing engine 52 may retrieve the historical data from the reference point database 58 that is for previous search queries 62 which are the same or similar to the search query 62 currently being processed (e.g., having the same or similar search criteria). Thereafter, the query processing engine 52 may determine the initial data reference point based on the values that were assigned to the interesting and/or purchased results 64 in the retrieved historical data. For example, for each of the one or more categories, the query processing engine 52 may compute an average of the values assigned for that category to each of the interesting and/or purchased results 64, and then assign the average to the data reference point for that category.

In some embodiments, the query processing engine 52 may determine the initial data reference point prior to the receipt of the search query 62 under consideration. In particular, after previous search queries 62 having the same or similar search criteria have finished being processed by the query processing engine 52, the query processing engine 52 may be configured to calculate and store a data reference point based on the actions that users took in relation to the previous search queries 62, such as indicating that a result 64 is interesting and/or making a purchase based on a result 64. Specifically, the query processing engine 52 may be configured to compute averages from the interesting and/or purchased results 64, and define a data reference point based on these averages, as described above. The query processing engine 52 may perform this calculation multiple times prior to receiving the current search query 62, each time being either to update a previously determined data reference point based on additional search queries 62, or to create a new data reference point based on a group of previous search queries 62 having the same or similar search criteria for which a data reference point has not yet been computed. Upon a data reference point being created or updated, the query processing engine 52 may be configured to store the data reference point in the reference point database 58 such that it is associated with one or more of the search criteria on which the data reference point was based within the reference point database 58. In this way, when the current search query 62 is received at the query processing engine 52, the query processing engine 52 may retrieve the appropriate data reference point from the reference point database 58 based on the search criteria of the current search query 62, and do so without having to compute the data reference point, which enables the query processing engine 52 to realize improved response times by reducing system latency.

In further embodiments, the initial data reference point may be manually set by the user (e.g., each of the values assigned to the initial data reference point may correspond to the search criteria included in the search query 62, and not be based on averages computed from previous search queries 62). Alternatively, the initial data reference point may be defined by a system administrator. The query processing engine 52 may also utilize social media data (e.g., data retrieved with a login from FACEBOOK or GOOGLE), and/or user behavior data associated with previous search queries 62 submitted by users having similar characteristics, to determine the initial data reference point. For example, if social media data and/or behavior data indicates that persons in a particular age group typically prefer lower priced travel options, then an initial data reference point determined for a search query 62 submitted by a user in the particular age group may include a value for the price category that is lower than the average value computed for the price category from previous search queries 62 having the same or similar search criteria as the search query 62 currently being processed.

In block 112, the result 64 closest to the data reference point may be determined, such as by the query processing engine 52. In particular, the query processing engine 52 may be configured to determine which of the results 64 is closest to the initial data reference point, such as by comparing the values assigned to each of the results 64 for the one or more categories to the values assigned to the initial data reference point for the one or more categories, and select the result 64 closest to the initial data reference point for display to the user.

In some embodiments, the query processing engine 52 may conduct the comparison by computing the weighted quadratic distance between each result 64 and the initial data reference point. This computation may be based on the values of the initial data reference point and the values assigned to each of the results 64 for the one or more categories, and may also be based on the weight values assigned to the one or more categories that indicate how important each of the categories is to the user. The query processing engine 52 may then select the result 64 having the lowest weighted quadratic distance as the result 64 that is closest to the initial data reference point. The query processing engine 52 may calculate the weighted quadratic distance for each result 64 using the following formula:

$$\text{Weighted Quadratic Distance} = \Sigma_{i=1}^{n} W_i * \sqrt{(V_i - C_i)^2}$$

where n is the number categories, $C_i$ is the value assigned to the initial data reference point for the i'th category, $V_i$ is the value assigned to the result 64 for the i'th category, and $W_i$ is the weight value for the i'th category for the particular user that submitted the search query 62.

In block 114, the selected result 64 determined closest to the data reference point may be displayed to the user for his or her review. In particular, the query processing engine 52 may cause the selected result 64 to be transmitted to the client device 12, which upon receipt of the result 64, may be configured to display the result 64 to the user.

Figure 5:
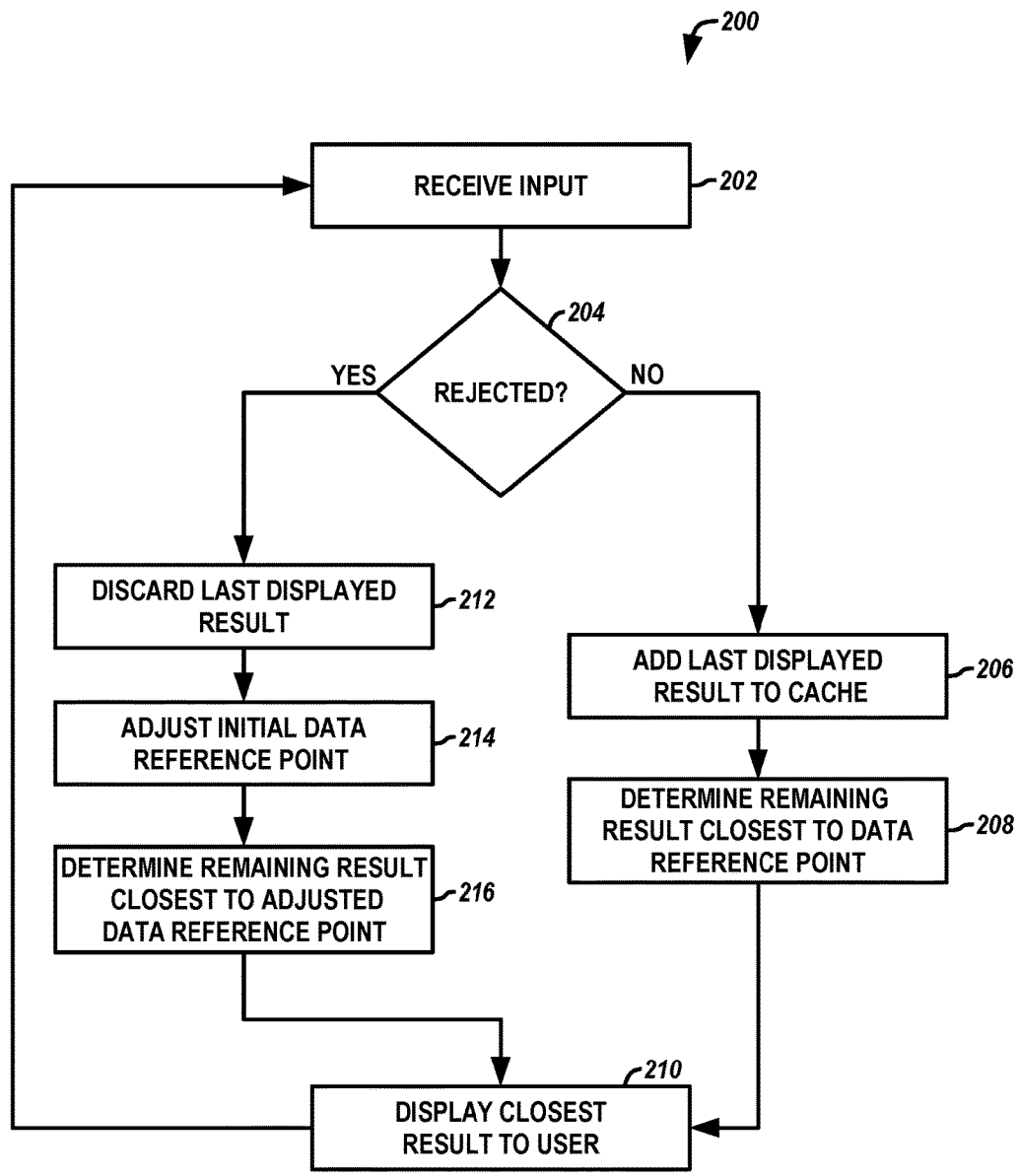
FIG. 5 is a flowchart of an exemplary method for displaying results to a search query for an electronic dataset to a user that may be performed by the processing architecture of FIG. 3.

FIG. 5 illustrates a process 200 for selecting subsequent results 64 for display to the user in response to receiving an input 66 from the user regarding a previously display result 64. The process 200 may be performed by the query processing engine 52.

In block 202, after the previous result 64 has been transmitted to and displayed by the client device 12, an input 66 may be received, such as at the query processing engine 52, that relates to the previously displayed result 64. In particular, a user may utilize the client device 12 to generate and submit the input 66 to the query processing engine 52. The input 66 may indicate whether or not the user is interested in the previously displayed result 64. For example, the input 66 may include a rejection of the previously displayed result 64, and may include a rationale for the rejection. Alternatively, the input 66 may include an indication that a user is interested in the previously displayed result 64.

In block 204, in response to receiving the input 66, a determination may be made of whether or not the input 66 represents an interest of the previously displayed result 64 or a rejection of the previously displayed result 64. If the input 66 indicates that the user is interested with the previously displayed result 64 ("NO" branch of block 204), then in block 206, the previously displayed result 64 may be added to a cache. This cache may include each of the results 64 displayed to the user in which the user has indicated an interest. In this way, the user may later refer to the cache to review those results 64 in which he or she has an interest, and possibly make a purchase based on one or more of the cached results 64.

After the previously displayed result 64 is added to the cache, in block 208, the result 64 that has not yet been transmitted to the client device 12 for display (i.e., one of the "remaining" results 64) and that is closest to the initial data reference point may be determined, such as via the weighted quadratic distance formula described above, for display by the client device 12. In block 210, the determined result 64 may be displayed to the user, such as via transmission of the determined result 64 to the client device 12, which may then display the determined result 64 and receive another input 66 regarding the determined result 64.

Alternatively, if the input 66 indicates that the user is not interested and has rejected the previously displayed result 64 ("YES" branch of block 204), then in block 212, the previously displayed result 64 may be discarded. Thereafter, in block 214, the initial data reference point may be adjusted based on the input 66. In particular, the input 66 may include a rationale for the rejection of the previously displayed result 64, and the initial data reference point may be adjusted based on the rationale. In one embodiment, the rationale may indicate that an attribute of the previously displayed result 64 associated with one of the categories (and correspondingly the value assigned to the previously displayed result 64 for the one category) is too high (or too low) from the user's perspective. In response to receiving such a rationale, the query processing engine 52 may adjust the initial data reference point by decreasing (or increasing) the value assigned to the initial data reference point that is associated with the category associated with the attribute (and correspondingly with the value) indicated by the rationale as being too high (or too low).

For example, the rationale may indicate that the average temperature for a proposed travel destination, which may be associated with the weather category, is too cold (or too hot) from the user's perspective. Accordingly, in response to receiving an input 66 with such a rationale, the query processing engine 52 may adjust the initial data reference point by increasing (or decreasing) the value assigned to the initial data reference point for the weather category, such as by a fixed number (e.g., 1, 2, 5, 10, etc.), a factor, or a percentage. As other examples, the rationale may indicate that a travel recommendation includes a price that is too expensive or not expensive enough, or includes a travel destination that is too close to the origin search criterion or not close enough, which may cause the query processing engine 52 to adjust the value assigned to the data reference point for the price category or the distance category, respectively.

When the rationale of an input 66 relates to a particular one of the categories, such as the price category, then it may be assumed that this particular category is important to the user, as this category is being actively managed by the user. Accordingly, in some embodiments, upon receiving an input 66 that includes a rationale relating to a given category, the query processing engine 52 may be configured to increase the weight value assigned to the category to which the rationale relates, such by a fixed number, a factor, or a percentage. For example, if the input 66 indicates that the temperature associated with a travel recommendation is too low, then the search query 62 may be configured to increase the weight value assigned to the weather category prior to determining the remaining result 64 that is closest to the adjusted data reference point. In this way, that temperature category will have additional influence when determining which remaining result 64 is closest to the adjusted data reference point. In other words, the next result 64 selected for display by the client device 12 may be based on the increased weight value.

In block 216, after the initial data reference point has been adjusted, and possibly after the weight assigned to one of the categories has been increased, the result 64 that has not yet been transmitted to the client device 12 and that is closest to the adjusted data reference point may be selected for display. In particular, the query processing engine 52 may compute the weighted quadratic distance, as discussed above, between the adjusted data reference point and each of the results 64 that have not yet been transmitted to the client device 12 for display, and select the result 64 with the lowest weighted quadratic distance as the next result 64 to display to the user. In this way, the query processing engine 52 may select the next result 64 for display based on the rationale for the rejection of the previous displayed result 64.

After the result 64 closest to the adjusted data reference point is selected, in block 210, the selected result 64 may be displayed to the user, such as via the query processing engine 52 transmitting the selected result 64 to the client device 12 for display by the client device 12. The process 200 may then be repeated for each input 66 provided by the user for a displayed result 64.

Figure 6:
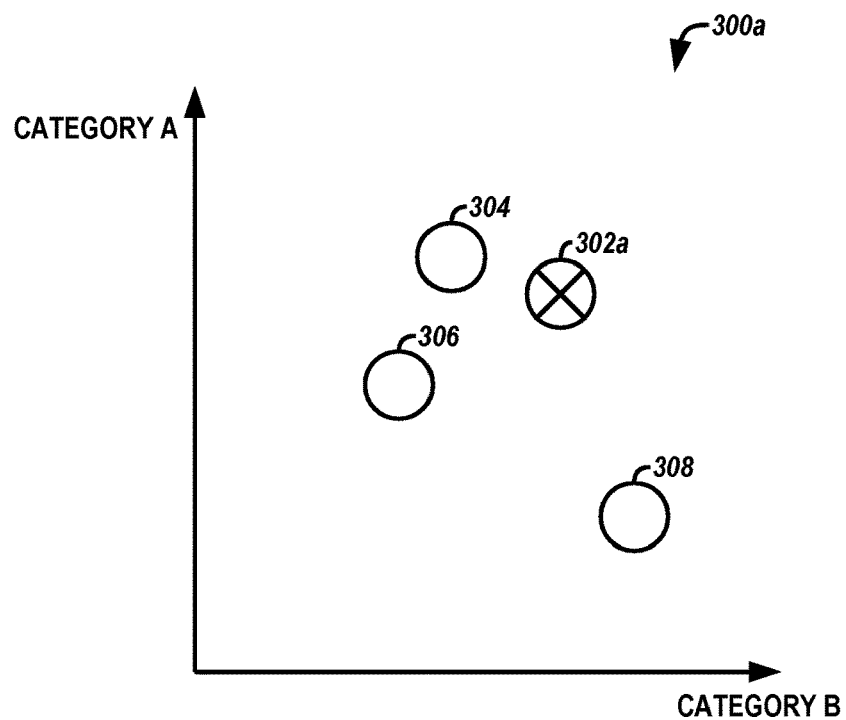
FIG. 6 is an exemplary graph including an initial data reference point and results to a search query for an electronic dataset.
Figure 7:
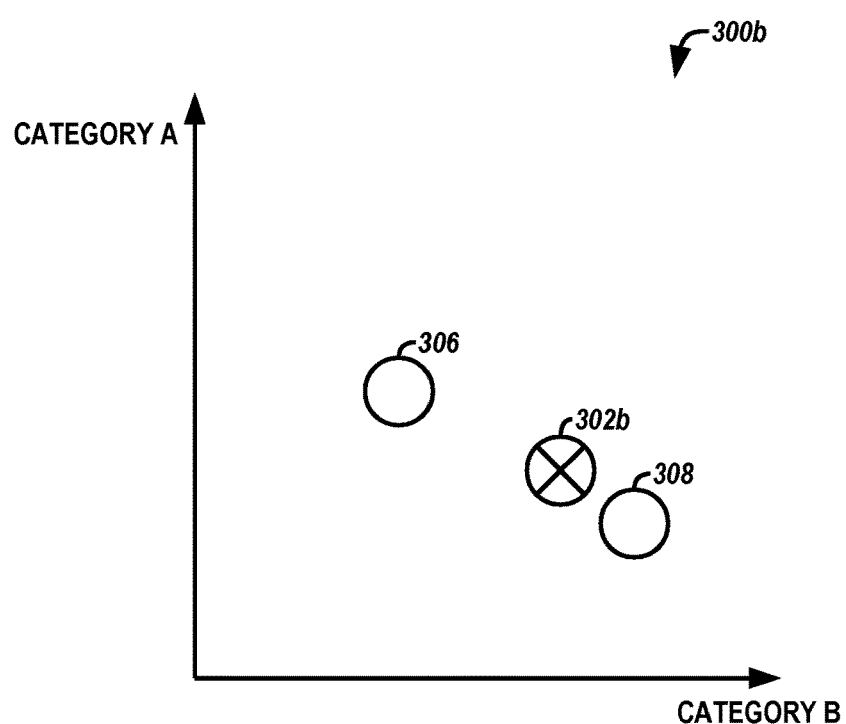
FIG. 7 is an exemplary graph including an adjusted data reference point and results to a search query for an electronic dataset.

FIGS. 6 and 7 provide graphs to illustrate an example of the processes 100 and 200. In particular, FIG. 6 illustrates a graph 300a that includes an initial data reference point 302a and results 304, 306, and 308. Each of the results 304, 306, and 308, and the initial data reference point 302a, include a value assigned thereto for "Category A" and a value assigned thereto for "Category B". As previously discussed, in block 112 of the process 100, the result 64 closest to the initial data reference point 302a may be determined, such as using the weighted quadratic distance formula described above. Based on the graph 300a, the result 64 that is closest to the initial data reference point 302a may be the result 304. Accordingly, in block 114 of the process 100, the result 304 may be displayed to the user for review, such as via transmission to the client device 12.

FIG. 7 illustrates an exemplary graph 300b that may represent the outcome of block 214 of the process 200. In particular, after being displayed the result 304, the user may provide an input 66 indicating that an attribute of the displayed result 304 relative to Category A is too high. Accordingly, as illustrated in the graph 300b, the initial data reference point 302a may be adjusted so that a lower value is assigned thereto for Category A (i.e., adjusted data reference point 302b). Thereafter, in block 216 of the process 200, a determination may be made of which remaining result 64 is closest to the adjusted data reference point 302b. In the illustrated embodiment, the remaining result 64 that is closest to the adjusted data reference point 302b may be the result 308. Accordingly, in block 210 of the process 200, the result 308 may be displayed to the user for review, such as via transmission to the client device 12. Note that if the input 66 had indicated that the user was interested in the result 64, then the initial data reference point 302a may not have been adjusted, and in block 208 of the process 200, the remaining result 64 that is closest to the initial data reference point 302a may have been result 306 instead of result 308. Moreover, differences in the weight values assigned to Category A and Category B may also affect the above outcome.

Figure 8:
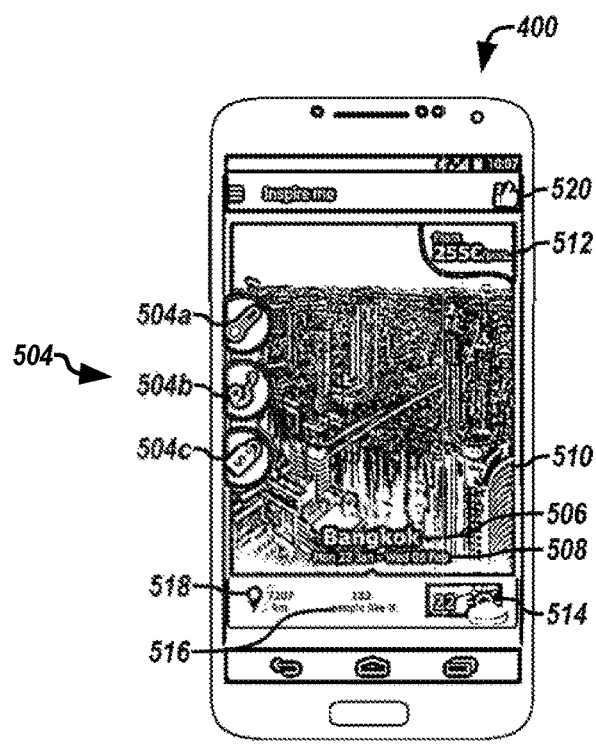
FIG. 8 is a view of an exemplary graphical user interface that may be provided by one or more of the computer systems of FIG. 1.

FIG. 8 illustrates an exemplary GUI 400 that may be generated by the client device 12 and/or query processing engine 52 to display a selected result 64 to the user. In particular, the client device 12 may be configured to display GUI 400 in response to receiving a result 64 selected for display to the user on a screen of the client device 12. The GUI 400 may be configured to accept inputs from the user that indicate whether the user is interested or disinterested in the displayed result 64. In the illustrated embodiment, the displayed result 64 is a travel recommendation that includes Bangkok as a suggested travel destination.

The GUI 400 may include an image 510 (e.g., an image of Bangkok), that may be part of the supplemental data portion of the result 64 selected to be displayed to the user. The image 510 may have been retrieved from one of the supplemental information databases 56 during the process 100. The GUI 400 may also include interactive icons 504 that are each associated with a different one of the categories for which values have been assigned to the result 64 selected for display. In the illustrated embodiment, the interactive icons 504 include an icon 504a that is associated with the weather category, an icon 504b that is associated with the distance category, and an icon 504c that is associated with the price category. The interactive icons 504 may be utilized by the user to generate and provide an input 66 to the query processing engine 52 that indicates a rationale that the user is not interested in the displayed result 64, which is described in more detail below.

The GUI 400 may further include other information included in the result 64 selected for display to the user. For example, when the result 64 is a travel recommendation, the GUI 400 may also include a travel destination name 506 (e.g., Bangkok), a date or date range 508 (e.g., Mon 22 January-Wed 5 February), a price 512 (e.g., 255€/pers.), weather information 514 (e.g., an average temperature of twenty two degrees and partly cloudy during the relevant date or dates), social network data 516 (e.g., 123 people like the travel destination), and/or distance information 518 (e.g., the travel destination is 7207 km from the origin search criterion provided in the search query 62). The GUI 400 may also include an interactive icon 520 (e.g., a thumbs-up symbol), which may, when selected, generate and provide an input 66 to the query processing engine 52 that indicates the user is interested in the displayed result 64. The interactive icon 520 may also include a number (e.g., two), that represents the number of previous results 64 in which the user has indicated an interest. In addition or alternatively to the interactive icon 520, the GUI 400 may be configured such that tapping the image 510 generates and provides an input 66 to the query processing engine 52 that indicates the user is interested in the displayed result 64.

Figure 9:
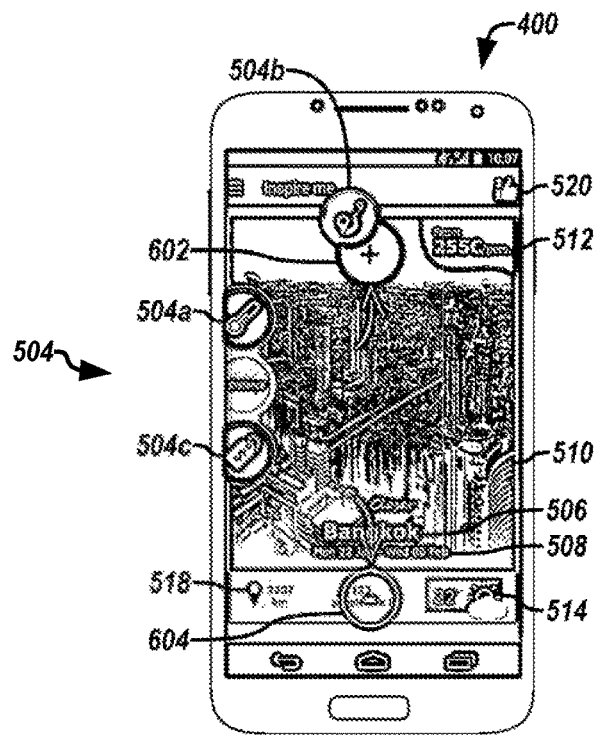
FIG. 9 illustrates an exemplary interaction with the graphical user interface of FIG. 8.

FIG. 9 illustrates how a user may interact with the GUI 400 to provide an input 66 to the query processing engine 52 that indicates the user is not interested in the displayed result 64. In the illustrated embodiment, the user may select one of the interactive icons 504 associated with the categories for which values have been assigned to the result 64, and drag the icon towards either a top portion of the GUI 400 or a bottom portion of the GUI 400. Upon interacting with and moving one of the interactive icons 504, the GUI 400 may be configured to display an increase graphic 602 and a decrease graphic 604. In response to the user dragging one of the interactive icons 504 to or proximate the increase graphic 602, an input 66 may be generated and provided to the query processing engine 52 that indicates the user's disinterest in the selected result 64 because an attribute of the displayed result 64 relating to the category associated with the dragged icon is too low. Alternatively, in response to the user dragging one of the interactive icons 504 to or proximate the decrease graphic 604, an input 66 may be generated and provided to the query processing engine 52 that indicates the user's disinterest in the displayed result 64 because the attribute of the result 64 relating to the category associated with the dragged icon is too high. For example, in the illustrated embodiment, a user has selected and dragged the icon 504*b*, which is associated with the distance category, proximate the increase graphic 602. Accordingly, once the icon 504*b* is released by the user, the query processing engine 52 may receive an input 66 that indicates the user's disinterest in Bangkok as a travel destination because it is not far enough from the user's origin, and based thereon adjust the data reference point by assigning an increased value thereto for the distance category.

The GUI 400 may also be configured to support additional gestures by the user in order to indicate the user's interest or disinterest of a result 64 selected to be displayed to the user. For example, if a user is interested in a displayed result 64, then the GUI 400 may be configured so that the user may select and slide the image 510 upwards. In response, the number included with the interactive icon 520 may be incremented, as another result 64 may be added to the cache as a result of the user's gesture (block 206 of the process 200). Alternatively, if the user is not interested in the currently displayed result 64, but does not wish to alter the current data reference point, then the GUI 400 may be configured to enable the user to select and slide down the image 510 without interacting with the interactive icons 504. Consequently, block 214 of the process 200 may be skipped, and the query processing engine 52 may proceed to perform block 216 of the process 200 by determining the remaining result 64 that is closest to the non-adjusted data reference point. In addition, the GUI 400 may be configured such that, upon the user touching and releasing the image 510, additional details about the displayed result 64 may be provided via the GUI 400.

Moreover, in order to limit the number of interactive icons 504 that are included in the GUI 400 so as to not overcrowd the display of the client device 12, but also to enable the user to effectively indicate a rationale that he or she is not interested in a displayed result 64, the categories associated with the interactive icons 504 may be dynamically tailored towards the user and/or the user's behaviors. For example, if social network data, such as from the supplemental information databases 56, indicates that the user is part of a group, such as a particular age group, that is not typically concerned with a particular category, then the GUI 400 may be generated so as to omit the interactive icon 504 associated with that category, and instead display an interactive icon 504 associated another category, such as the duration category. Moreover, as the user provides inputs 66 for displayed results 64, it may become apparent that the user is not focused on a particular category, such as the price category, due to a lack of use of the interactive icon 504 associated with the particular category. Accordingly, for the following result 64 that is displayed to the user, the GUI 400 may replace the interactive icon 504 associated with the particular category with an interactive icon 504 associated with a category of potentially more importance to the user, such as the duration category.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method for searching an electronic dataset, the method comprising:
   receiving, at one or more processors and from a client device, a search query for the electronic dataset; and
   in response to receiving the search query:
      determining, by the one or more processors, a plurality of results to the search query, each of the results including data from the electronic dataset;
      for each result among the plurality of results, computing a quadratic distance between a corresponding result and an initial data reference point determined for the search query;
      selecting, by the one or more processors, a first result of the plurality of results for display by the client device based on a respective quadratic distance computed for the first result;
      transmitting, by the one or more processors, the first result to the client device for display by the client device;
      after the first result is transmitted to the client device, receiving, at the one or more processors and from the client device, a rejection of the first result by a user, the rejection comprising a rationale for the rejection of the first result; and
      in response to receiving the rejection of the first result:
         selecting, by the one or more processors, a second result of the plurality of results for display by the client device based on the rationale for the rejection; and
         transmitting, by the one or more processors, the second result to the client device for display by the client device.

2. The method of claim 1, further comprising:
   in response to receiving the search query, determining the initial data reference point based on the search query,
   wherein selecting the first result for display by the client device comprises:
      determining which of the results is closest to the initial data reference point; and
      selecting the result that is closest to the initial data reference point as the first result.

3. The method of claim 2, wherein selecting the second result for display by the client device based on the rationale for the rejection comprises:
   in response to receiving the rejection, adjusting the initial data reference point based on the rationale;
   determining which of the results that have not yet been transmitted to the client device for display is closest to the adjusted data reference point; and
   selecting the result that has not yet been transmitted to the client device for display that is closest to the adjusted data reference point as the second result.

4. The method of claim 3, further comprising:
   after the second result is transmitted to the client device, receiving, from the client device, an indication that the user is interested in the second result; and
   in response to receiving the indication that the user is interested in the second result:
      adding the second result to a cache of results in which the user is interested;
      determining which of the results that have not yet been transmitted to the client device for display is closest to the adjusted data reference point; and
      transmitting the result that has not yet been transmitted to the client device for display that is closest to the adjusted data reference point to the client device for display.

5. The method of claim 2, wherein the initial data reference point includes a plurality of first values that are each associated with a different one of a plurality of categories, each of the results includes a plurality of attributes that are each related to a different one of the categories, and determining the results to the search query comprises:
   assigning a plurality of second values to each of the results, each of the second values being associated with a different one of the categories and being based on the attribute of the result that relates to the associated category,
   wherein determining which of the results is closest to the initial data reference point comprises:
      for each of the results, computing a first weighted quadratic distance between the initial data reference point and the result based on the first values of the initial data reference point and the second values assigned to the result; and selecting the result with the lowest first weighted quadratic distance as the result that is closest to the initial data reference point.

6. The method of claim 5, further comprising:

assigning a third value to each of the categories, the third value indicating an importance of the category to the user, wherein computing the first weighted quadratic distance between the initial data reference point and each of the results is further based on the third value assigned to each of the categories.

7. The method of claim 6, wherein the rationale for the rejection relates to one of the categories, and selecting the second result for display by the client device based on the rationale for the rejection comprises:

increasing the third value assigned to the category to which the rationale for the rejection relates; and selecting the second result for display by the client device based on the increased third value.

8. The method of claim 5, wherein the rationale for the rejection indicates that one of the second values assigned to the first result is too low, and selecting the second result for display by the client device based on the rationale for the rejection comprises:

adjusting the initial data reference point by increasing the first value that is associated with the category associated with the second value indicated by the rationale as being too low;

computing a second weighted quadratic distance between the adjusted data reference point and each of the results that have not yet been transmitted to the client device for display; and selecting the result with the lowest second weighted quadratic distance as the second result.

9. The method of claim 5, wherein in response to receiving the first result, the client device is configured to:

display a graphical user interface for the first result on a screen of the client device, the graphical user interface including a plurality of icons, each of the icons being associated with a different one of the categories, wherein the graphical user interface is configured to enable the user to move one of the icons to one of a plurality of portions of the screen of the client device, wherein the rationale for rejecting the first result is determined based on which of the portions of the screen the icon is moved.

10. The method of claim 1, wherein the search query comprises a plurality of search criteria, the electronic dataset comprises a plurality of primary object databases, a cache database, and a plurality of supplemental information databases provided by a plurality of third parties, and determining the results to the search query comprises:

retrieving, from the primary object databases, a plurality of primary data objects based on the search criteria;

after retrieving the primary data objects, retrieving, from the cache database, supplemental data for each primary data object of a first subset of the primary data objects, the cache database including supplemental data retrieved in connection with one or more previous search queries;

after the supplemental data for each primary data object in the first subset of primary data objects is retrieved from the cache database, retrieving, from the supplemental information databases provided by the third parties, supplemental data for each of the primary data objects for which supplemental data was not retrieved from the cache database, and formulating the results based on the primary data objects and the supplemental data retrieved from each of the primary data objects, wherein each of the results includes at least a portion of one of the primary data objects and the supplemental data retrieved for the primary data object.

11. A system for searching an electronic dataset, the system comprising:

at least one processor; and a memory storing instructions that, upon execution by the at least one processor, cause the system to:

in response to receiving, from a client device, a search query for the electronic dataset:

determine a plurality of results to the search query, each of the results including data from the electronic dataset;

for each result among the plurality of results, computing a quadratic distance between a corresponding result and an initial data reference point determined for the search query;

select a first result of the plurality of results for display by the client device based on a respective quadratic distance computed for the first result; and transmit the first result to the client device for display by the client device; and after the first result is transmitted to the client device, and in response to receiving, from the client device, a rejection of the first result by a user, the rejection comprising a rationale for the rejection of the first result:

select a second result of the plurality of results for display by the client device based on the rationale for the rejection; and transmit the second result to the client device for display by the client device.

12. The system of claim 11, wherein the instructions upon execution further cause the system to:

in response to receiving the search query, determine the initial data reference point based on the search query, wherein the instructions cause the system to select the first result for display by the client device by causing the system to:

determine which of the results is closest to the initial data reference point; and select the result that is closest to the initial data reference point as the first result.

13. The system of claim 12, wherein the instructions cause the system to select the second result for display by the client device based on the rationale for the rejection by causing the system to:

in response to receiving the rejection, adjust the initial data reference point based on the rationale;

determine which of the results that have not yet been transmitted to the client device for display is closest to the adjusted data reference point; and select the result that has not yet been transmitted to the client device for display that is closest to the adjusted data reference point as the second result.

14. The system of claim 13, wherein the instructions upon execution further cause the system to:

after the second result is transmitted to the client device, and in response to receiving, from the client device, an indication that the user is interested in the second result:

add the second result to a cache of results in which the user is interested;

determine which of the results that have not yet been transmitted to the client device for display is closest to the adjusted data reference point; and transmit the result that has not yet been transmitted to the client device for display that is closest to the adjusted data reference point to the client device for display.

15. The system of claim 12, wherein the initial data reference point includes a plurality of first values that are each associated with a different one of a plurality of categories, each of the results includes a plurality of attributes that are each related to a different one of the categories, and the instructions cause the system to determine the results to the search query by causing the system to:

assign a plurality of second values to each of the results, each of the second values being associated with a different one of the categories and being based on the attribute of the result that relates to the associated category, wherein the instructions cause the system to determine which of the results is closest to the initial data reference point by causing the system to:

for each of the results, compute a first weighted quadratic distance between the initial data reference point and the result based on the first values of the initial data reference point and the second values assigned to the result; and select the result with the lowest first weighted quadratic distance as the result that is closest to the initial data reference point.

16. The system of claim 15, wherein the instructions upon execution further cause the system to:

assign a third value to each of the categories, the third value indicating an importance of the category to the user, wherein the instructions cause the system to compute the first weighted quadratic distance between the initial data reference point and each of the results based on the third value assigned to each of the categories.

17. The system of claim 16, wherein the rationale for the rejection relates to one of the categories, and the instructions cause the system to select the second result for display by the client device based on the rationale for the rejection by causing the system to:

increase the third value assigned to the category to which the rationale for the rejection relates; and select the second result for display by the client device based on the increased third value.

18. The system of claim 15, wherein the rationale for the rejection indicates that one of the second values assigned to the first result is too low, and the instructions cause the system to select the second result for display by the client device based on the rationale for the rejection by causing the system to:

adjust the initial data reference point by increasing the first value that is associated with the category associated with the second value indicated by the rationale as being too low;

compute a second weighted quadratic distance between the adjusted data reference point and each of the results that have not yet been transmitted to the client device for display; and select the result with the lowest second weighted quadratic distance as the second result.

19. The system of claim 15, wherein in response to receiving the first result, the client device is configured to:

display a graphical user interface for the first result on a screen of the client device, the graphical user interface including a plurality of icons, each of the icons being associated with a different one of the categories, wherein the graphical user interface is configured to enable the user to move one the icons to one of a plurality of portions of the screen of the client device, wherein the rationale for rejecting the first result is determined based on which of the portions of the screen the icon is moved.

20. A computer program product comprising:

a non-transitory computer readable storage medium; and instructions stored on the non-transitory computer readable storage medium that, upon execution by one or more processors of a system, cause the system to:

in response to receiving, from a client device via a network, a search query for an electronic dataset:

determine a plurality of results to the search query, each of the results including data from the electronic dataset;

for each result among the plurality of results, computing a quadratic distance between a corresponding result and an initial data reference point determined for the search query;

select a first result of the plurality of results for display by the client device based on a respective quadratic distance computed for the first result; and transmit the first result to the client device via the network for display by the client device; and after the first result is transmitted to the client device, and in response to receiving, from the client device via the network, a rejection of the first result by a user, the rejection comprising a rationale for the rejection of the first result:

select a second result of the plurality of results for display by the client device based on the rationale for the rejection; and transmit the second result to the client device via the network for display by the client device.

* * * * *